United States Patent [19]

Farris et al.

[11] 3,957,204

[45] May 18, 1976

[54] PIVOT SPRINKLER

[76] Inventors: Howard R. Farris, P.O. Box 1001, 280 Island Ave., Apt. 1502, Reno, Nev. 89501; Calmer J. Johnson, P.O. Box 748, Mason Road & Highway 3 S., Yerington, Nev. 89447

[22] Filed: Jan. 27, 1975

[21] Appl. No.: 544,657

[52] U.S. Cl. ............................. 239/177; 239/212
[51] Int. Cl.² ........................................ B05B 3/00
[58] Field of Search .......... 239/177, 178, 212, 213, 239/598; 137/344; 285/231, 233, 237

[56] References Cited
UNITED STATES PATENTS

| 204,695 | 6/1978 | Winebrenner | 239/177 |
| 2,228,031 | 1/1941 | Harsch | 239/598 |
| 3,415,270 | 12/1968 | Stilwell | 239/212 X |
| 3,628,729 | 12/1971 | Thomas | 239/177 |
| 3,680,787 | 8/1972 | Sherman | 239/177 |
| 3,729,141 | 4/1973 | Cornelius | 239/212 |

FOREIGN PATENTS OR APPLICATIONS

| 202,468 | 3/1956 | Australia | 239/178 |

Primary Examiner—John J. Love
Attorney, Agent, or Firm—Clarence A. O'Brien; Harvey B. Jacobson

[57] ABSTRACT

A pivot sprinkler incorporating an elongate irrigation pipe having a plurality of sprinklers thereon for irrigating a land area. The pipe is supported by a plurality of spaced supporting towers each of which is provided with supporting wheels and a drive mechanism. One end of the pipe is rotatably supported from and connected to a standpipe with control means being provided for retaining the support towers generally in aligned condition with the elongate pipe extending through the rotational center and forming rotational support for a drive wheel on each of the towers.

16 Claims, 13 Drawing Figures

PIVOT SPRINKLER

BACKGROUND OF THE INVENTION

1. Field of the Invention

The present invention generally relates to a pivot sprinkler which includes an elongate irrigation pipe having sprinklers thereon and rotatable about a central supply pipe and supported by spaced, wheeled towers which are maintained in substantial alignment by a control system.

2. Description of the Prior Art

Pivot sprinklers of the type having an elongate pipe with sprinklers thereon which is supported and propelled around a central standpipe are generally well known and have been used with some degree of success. One of the continuing problems which exist in this type of sprinkler is the retention of the elongate pipe in substantially straight condition as it moves in a circular path about a central standpipe. Various structures have been provided for supporting the elongate pipe and driving the pipe and controlling the relative position of the various supporting units to maintain them in generally aligned condition. This type of pivot sprinkler is typically illustrated in the following U.S. patents:

| | | |
|---|---|---|
| 2,711,615 | N. R. Boice, Jr. | June 28, 1955 |
| 2,807,500 | W. Clayton | Sept. 24, 1957 |
| 3,202,361 | D. Kane | Aug. 24, 1965 |
| 3,355,696 | J. Allwood | Nov. 28, 1967 |
| 3,394,729 | C. D. Bower et al. | July 30, 1968 |
| 3,608,826 | R. F. Reinke | Sept. 28, 1971 |
| 3,680,787 | R. M. Sherman | Aug. 1, 1972 |
| 3,712,544 | M. H. Ririe et al. | Jan. 23, 1973 |

SUMMARY OF THE INVENTION

An object of the invention is to provide a pivot sprinkler including an elongated sprinkler pipe supported by a plurality of wheeled units spaced longitudinally along the pipe with each of the wheeled units including a drive wheel for moving the pipe in a circular path about a central standpipe which supplies water to the irrigation pipe which structure can be maintained and serviced by individuals without substantial technical skills, is constructed of relatively simple and readily available components, quite dependable in operation with less chance of malfunction and relatively inexpensive to manufacture, install and operate.

Another object of the invention is to provide a pivot sprinkler in accordance with the preceding object in which each of the wheeled units includes a relatively large drive wheel with the irrigation pipe extending through the rotational center of the drive wheel with the drive wheel being rotatably journaled on the irrigation pipe.

Still another object of the invention is to provide a pivot sprinkler as set forth in the preceding objects in which each wheeled support unit includes a tower-like structure and a cable truss support for the irrigation pipe.

Yet another important object of the invention is to provide a pivot sprinkler in accordance with the preceding objects in which each wheeled unit includes a smaller trailing wheel oriented rearwardly of the drive wheel and connected to the irrigation pipe by a frame structure for transmitting driving torque exerted by the drive wheel to the ground surface and stabilizing the wheeled unit.

A further object of the invention is to provide a pivot sprinkler having spray nozzles mounted thereon which will discharge the water rearwardly of the machine thereby leaving the wheel traction area relatively dry and to reduce to a minimum a tendency of the water spray to drift due to prevailing winds.

A still further object of the invention is to provide a pivot sprinkler driven by a reaction nozzle assembly from which the water is discharged for driving the drive wheels under the control of a solenoid valve operative in response to an alignment control for maintaining the irregation pipe substantially in a straight line condition.

Still another important object of the invention is to provide a pivot sprinkler in accordance with the preceding objects in which the rotatable connection between the irrigation pipe and central standpipe includes a flexible, sealed connection and control mechanism is provided at each of the wheeled support units for maintaining the pivot sprinkler in desired operating mode.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 3:
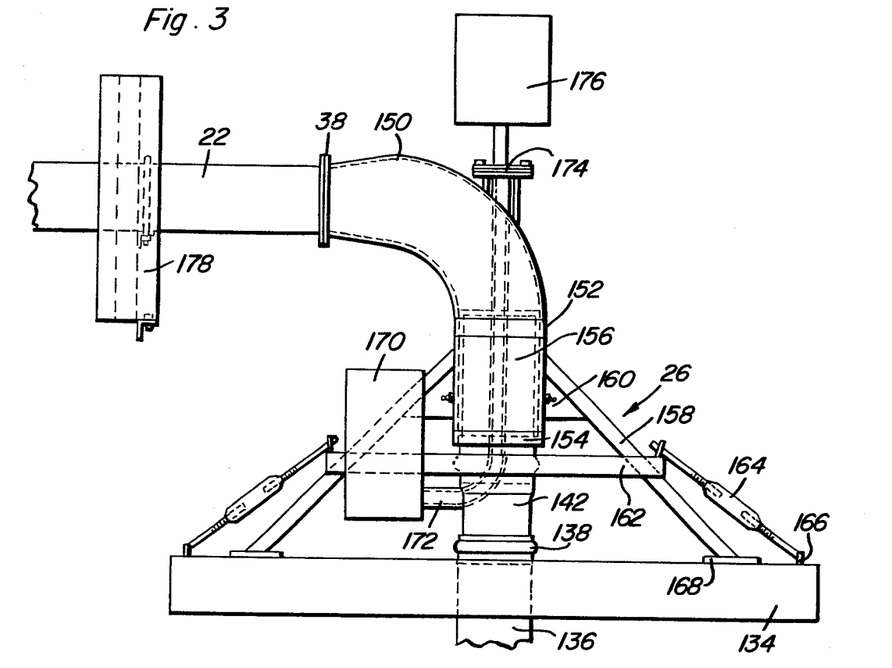
FIG. 3 is an enlarged elevational view of the central standpipe structure.
Figure 4:
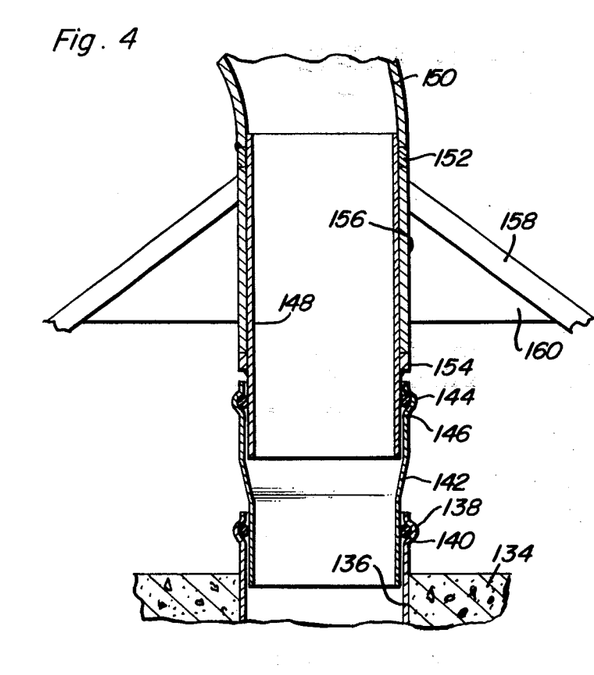
FIG. 4 is a vertical sectional view of the standpipe structure illustrating the rotating joint construction and the seal between the stationary and rotating components.
Figure 5:
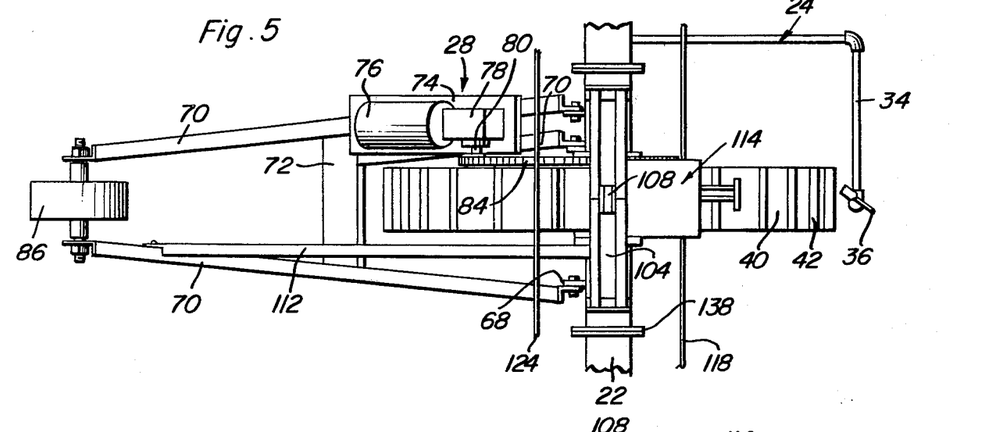
FIG. 5 is a plan view of one of the intermediate supporting units for the irrigation pipe.

Referring now specifically to FIGS. 1–10 of the drawings, this embodiment of the pivot sprinkler of the present invention is generally designated by reference numeral 20 and includes an elongated irrigation pipe 22 having a plurality of longitudinally spaced sprinklers 24 mounted thereon with the pipe 22 being movable in a circular path about a central standpipe generally designated by numeral 26 with the irrigation pipe being supported and driven by a plurality of intermediate or line drive towers 28 and an outer end drive tower 30 with the outermost end of the pipe 22 being provided with an end sprinkler or end gun 32. The specific details of the sprinklers 24, end sprinkler 32 or end gun 32 are not disclosed in detail inasmuch as the specific construction of the nozzles does not constitute a significant part of this embodiment of the present invention but as illustrated in FIG. 5, each of the sprinkers 24 includes a pipe 34 connected with the irrigation pipe 22 and provided with a nozzle 36.

The irrigation pipe 22 is in the form of a thin wall pipe constructed of sections which are provided with flanged couplings 38.

Figure 6:
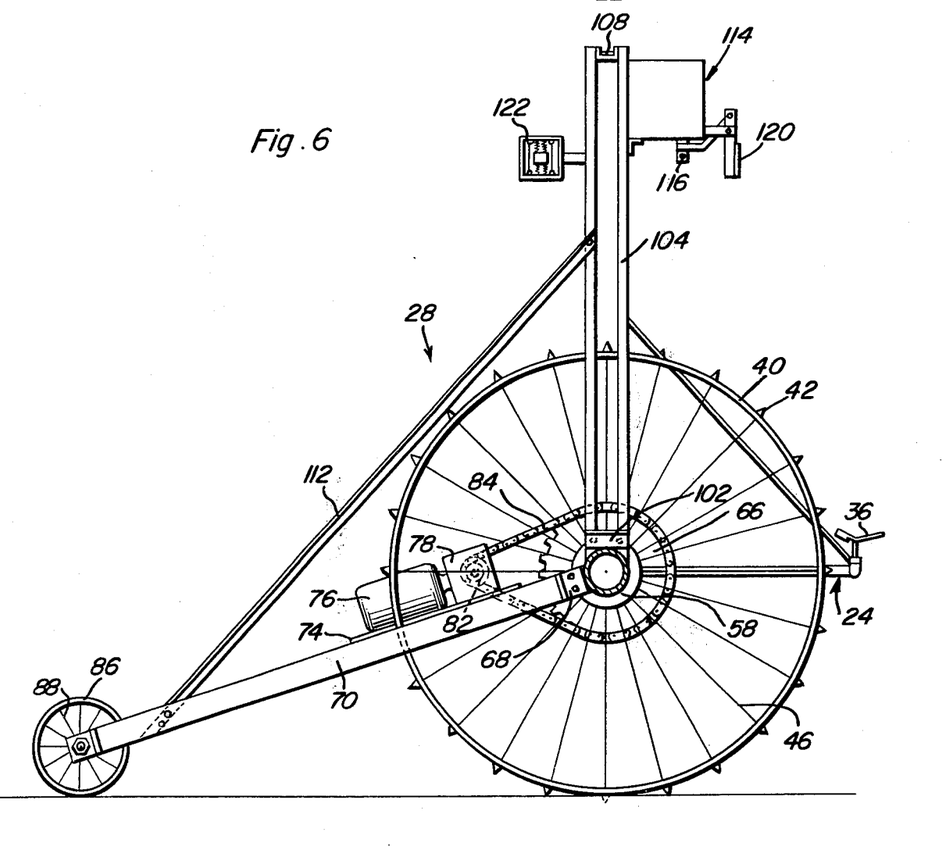
FIG. 6 is a side elevation view of the structure of FIG. 5.
Figure 7:
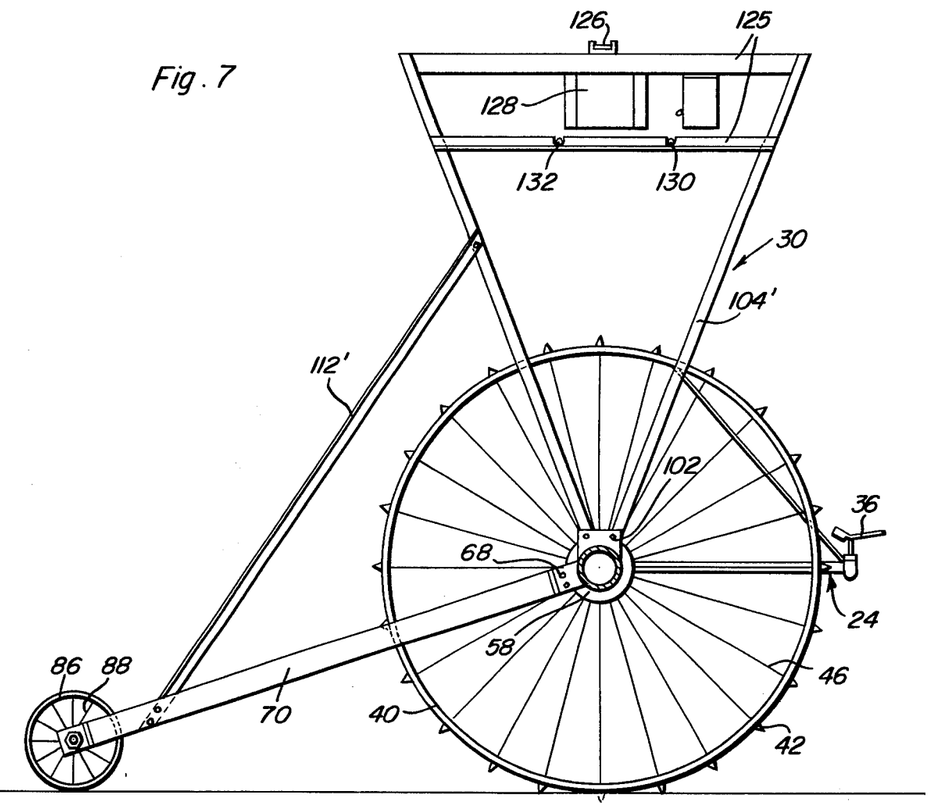
FIG. 7 is a side elevational view of the outer endmost supporting unit.

Each of the intermediate or line support towers or units 28 is of the same construction with the details thereof being illustrated in FIGS. 5–9 with FIG. 7 illustrating the end tower 30.

Each of the towers 28 includes a section of pipe 22 which forms a supporting axle for an enlarged drive wheel 40 which is of channel-shaped configuration and provided with transversely extending cleats 42 on the periphery thereof in spaced relation to each other. The wheel 40 is supported from a hub assembly 44 by a plurality of spokes 46.

Figure 8:
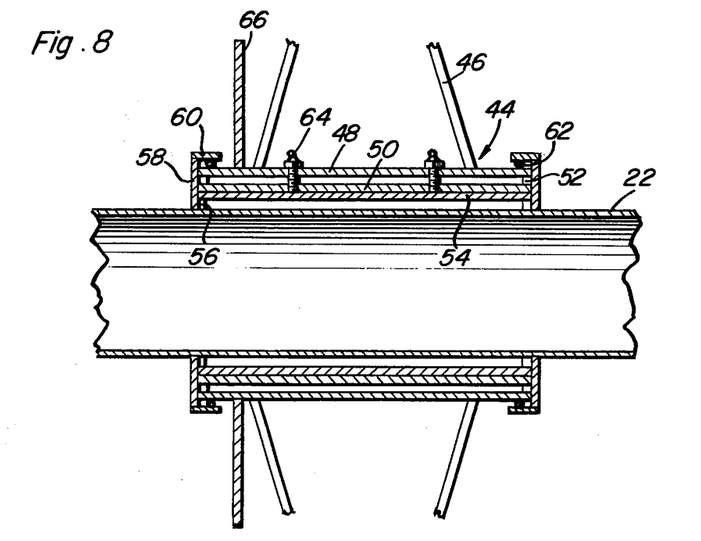
FIG. 8 is a sectional view, on an enlarged scale, illustrating the wheel hub and axle assembly for the drive wheel.
Figure 9:
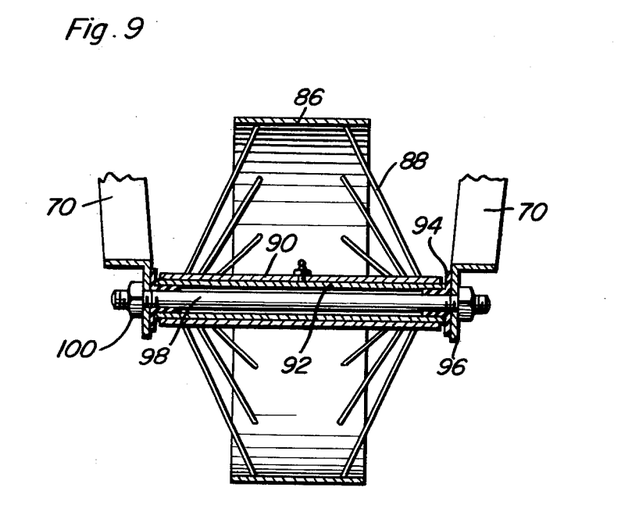
FIG. 9 is a sectional view, on an enlarged scale, illustrating the structural details of the axle hub assembly for one of the trailing wheels.

As illustrated in FIG. 8, the hub assembly 44 includes an outer cylindrical member 48 and an inner tubular member or hub 50 rigid and concentric therewith and disposed in spaced relation and a rigidly affixed in relation to each other by a flange or ring 52 welded respectively to the tubular members 48 and 50. The hub assembly 46 rotates on an axle 54 which is in the form of a cylindrical member that closely encircles the pipe section 22 in spaced relation thereto with the axle cylindrical member 54 being rigidly fixed to the pipe section 22 by a flange ring 56 welded to the pipe 22 and to the cylindrical member 54. Thus, the wheel 40, spokes 46 and hub assembly 44 rotate on the exterior of the cylindrical axle member 54. To prevent axial movement of the hub assembly 44 on the axle 54, annular flanges 58 are provided at each end of the axle member 54 and are rigidly secured thereto as by welding. The outer periphery of each flange 58 is provided with an inwardly extending flange 60 welded thereto in overlying but spaced relation to the periphery of the hub assembly 54. An annular water stop 62 interposed between the inner surface of the flange 60 and the cylindrical member 48 of the hub assembly 44 which may be in the form of a rod welded around the outer hub cylindrical member 48. With this construction, the hub assembly may rotate on the axle 54 with the pipe 22 defining the rotational axis for the wheel 40. Lubrication fittings 64 may be provided for communication with the relatively moving surfaces between the exterior of the cylindrical axle 54 and the inner cylindrical hub member 50. All of these components may be constructed of readily available pipe sections of standard dimensions. The spokes 46 are in the form of metal rods and are crossed from the outside edge of the wheel rim to the opposite end of the hub and welded to the hub and wheel rim respectively. The cleats 42 may be in the form of angle iron members of standard construction attached to the outer surface of the wheel 40 by welding or the like. Rigidly fixed to the hub assembly 44 adjacent one end thereof and outwardly of the spokes 46, there is provided a sprocket gear 66 which is symmetrical about the axis of the pipe 22. Also attached to the pipe 22 outwardly of the axle flanges 58 is a plurality of angle brackets 68 to which are attached laterally extending frame members 70. The frame members 70 are interconnected by an intermediate cross brace 72 with one of the frame members 70 terminating rigid with the inner edge of the brace member 72 as illustrated in FIG. 5 thereby providing rigid support for a mounting plate 74 for motor 76 having a gear head 78 thereon and an output shaft 80 which drives a sprocket gear 82 engaged with a sprocket chain 84 which also encircles the sprocket gear 66 on the hub assembly 44. The motor 76 and gear head 78 are mounted on the base plate 74 through a slot and bolt connection to enable adjustment of the tension of the drive chain 84. When the electric motor is driven, the drive chain 84 will drive the hub assembly 44 thus driving the wheel 40.

For transmitting the drive torque exerted by the driving wheel 40, the outer ends of the frame member 70 which extend beyond the brace member 72 are interconnected and rotatably support a trailing wheel 86. The trailing wheel 86 is illustrated in detail in FIG. 9 and includes a plurality of spokes 88 rigidly welded to the wheel and also rigidly welded to a cylindrical hub 90. The hub 90 is received on a cylindrical axle 92 which is slightly longer than the hub 90 and provided with pipe bushing 94 pressed into each end thereof with the pipe bushing including a flange which extends outwardly of the axle 92. The cylindrical axle 92 and the pipe bushings 94 are prevented from rotation and are rigidly secured to opposed flanges 96 on the frame members 70 by a through-bolt 98 having threaded nuts 100 on each end so that when the nuts 100 are tightened, the bolts 98, pipe bushings 94 and axle 92 become a rigid assembly with the cylindrical hub 90 rotatable thereon so that the wheel 86 can rotate freely with a suitable lubrication fitting being provided for lubrication the relatively movable surfaces between the interior of the hub 90 and the exterior of the axle 92.

Figure 1:
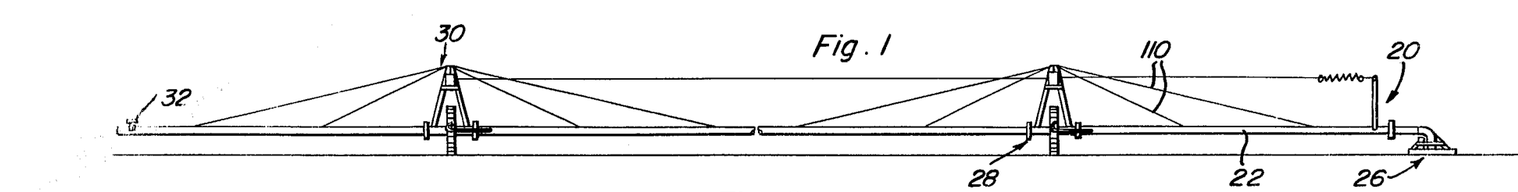
FIG. 1 is a diagrammatic side elevational view of the pivot sprinkler of the present invention illustrating the orientation of the components.
Figure 2:
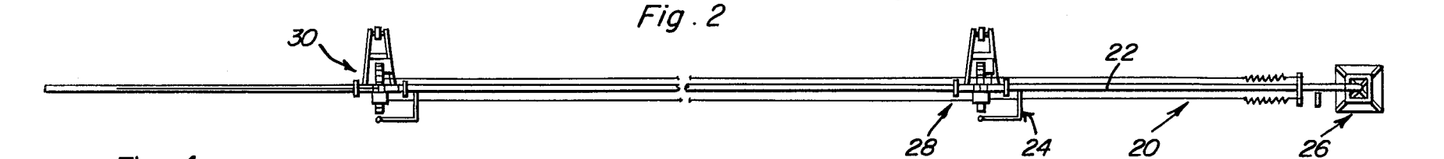
FIG. 2 is a top plan view of the construction of FIG. 1.
Figure 10:
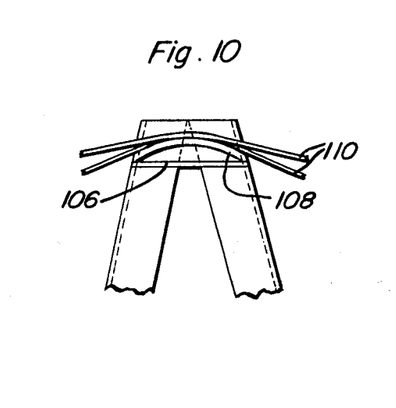
FIG. 10 is a fragmental sectional view illustrating the details of one of the cable guides at the upper end of the wheeled units.

Also attached to the pipe section 22 outwardly of the axle flanges 58 is a pair of attaching brackets 102 to which upwardly extending frame members or other supporting elements 104 are connected which converge upwardly in generally A-shaped configuration with the upper ends thereof being interconnected by a flange 106 having a rounded or curved convex member 108 rigidly fixed thereto as illustrated in FIG. 10 for forming a cable guide for flexible cables 110 which form trusses by connection with angle iron brackets or the like attached to the pipe 22 at longitudinally spaced points as diagrammatically illustrated in FIG. 1. A brace member 112 extends between the upwardly extending member 104 remote from the motor 76 outwardly and downwardly for connection with the corresponding brace member 70 as illustrated in FIGS. 5 and 6. Also attached to the upwardly extending members 104 is a microswitch housing and assembly 114 having an apertured actuator 116 associated therewith for receiving an alignment wire 118 and a depending wing gauge 120 is also connected with the actuator 116 to actuate the microswitch under certain wind conditions. Projecting rearwardly from the upwardly extending support members 104 is an emergency shut-off assembly 122 receiving another alignment wire 124 which will shut off the electrical supply to the electric motors and thus stopping the pivot sprinkler in the event that certain of the supporting towers become misaligned beyond a predetermined degree of misalignment thus eliminating the possibility of the pivot sprinkler from becoming destroyed or damaged due to excessive misalignment of the tower units 28.

FIG. 7 illustrates the end tower or supporting unit in which the structural components which are similar are provided with the same reference numeral with the upwardly converging members 104' also divering upwardly when observed from the end of the pipe 22 and braced by a brace 112'. In this construction, the upper ends of the members 104' are interconnected by longitudinal brace members 124 with the upper brace member including a cable guide 126 thereon and a travel control switch for the end drive wheel which is controlled by a timer and anchor points 130 and 132 for the alignment wires 118 and 124.

The standpipe 26 includes a supporting base 134 of concrete or the like having a supply pipe 136 extending upwardly therethrough with the supply pipe being connected with a well or any other source of water supply. The upper end of the supply pipe 136 is provided with an annular rib 138 defining a groove on the interior surface thereof receiving an O-ring seal 140. Telescoped into the upper end of the supply pipe 136 is a short pipe section 142 that is sealingly engaged by the O-ring 140 and provided with a rib 144 similar to the rib 138 for receiving an O-ring seal 146 therein. Telescoped into the pipe section 142 is a pipe section 148 which has its upper end welded to an elbow 150 which is rigidly connected to the irrigation pipe 22. Also welded to the elbow 150 is a wear ring 152 which thus becomes fixed with respect to the eblow 150 and the tube 148. The lower end of the tube 148 is provided with a similar wear ring 154 which is welded to the tubular pipe section 148 thereby providing a structure for captively retaining a tubular sleeve 156 rotatable with respect to the tubular pipe section 148. As illustrated, the tubular sleeve 156 is provided with a plurality of radially extending legs 158 welded to the sleeve 156 and reinforced by dust plates 160. A peripheral frame 162 encircles the legs 158 intermediate their length and the corners thereof are connected with the upper ends of turnbuckles 164 which are anchored to the base 134 by anchor members 166. Also, the legs 158 have feet or pads 168 which engage the concrete base 134 and are rigidly fixed thereto in any suitable manner so that the turnbuckles rigidify and retain the standpipe in proper orientation with the short pipe section 142 and its association with the O-rings 140 and 146 enabling some degree of flexiblity in the standpipe structure and enabling relative rotation between the sleeve 156 and the pipe section 148 and suitable lubrication fitting may be provided for this surface by positioning such fittings in the sleeve 156.

Also mounted on the frame 162 is a main switch box 170 having a conduit 172 extending centrally upwardly through the standpipe and projecting upwardly therefrom through a packing gland 174 into a collector ring assembly 176 so that electrical energy may be transmitted to the electric drive motors and other control components with the collector ring assembly 179 providing for relative rotation inasmuch as contact members engaging rings will pick up electrical energy and transmit it to the electric motors and other electrical components through a timer control panel 178 which is supported from the pipe 22 by a U-bolt clamp and angle iron support members or by any other suitable structural arrangement.

The details of construction of the electrical circuitry and control apparatus have not been illustrated inasmuch as they do not form a specific part of the present invention. The structural components of the pipe 22, the supporting towers or units 28 and 30 and the standpipe 26 are the essential components of this embodiment of the invention and are constructed of readily available structural components such as standard pipe, thin wall pipe, angle iron members, flanges and the like which can be obtained from available sources and which can be welded into the final structure in a convenient manner thus rendering the device relatively inexpensive to manufacture and the specific structure of the device is such that maintenance thereof will be at a minimum and, if necessary, the structure can be repaired or serviced by persons having a reasonable degree of technical skill.

Figures 11, 12, 13:
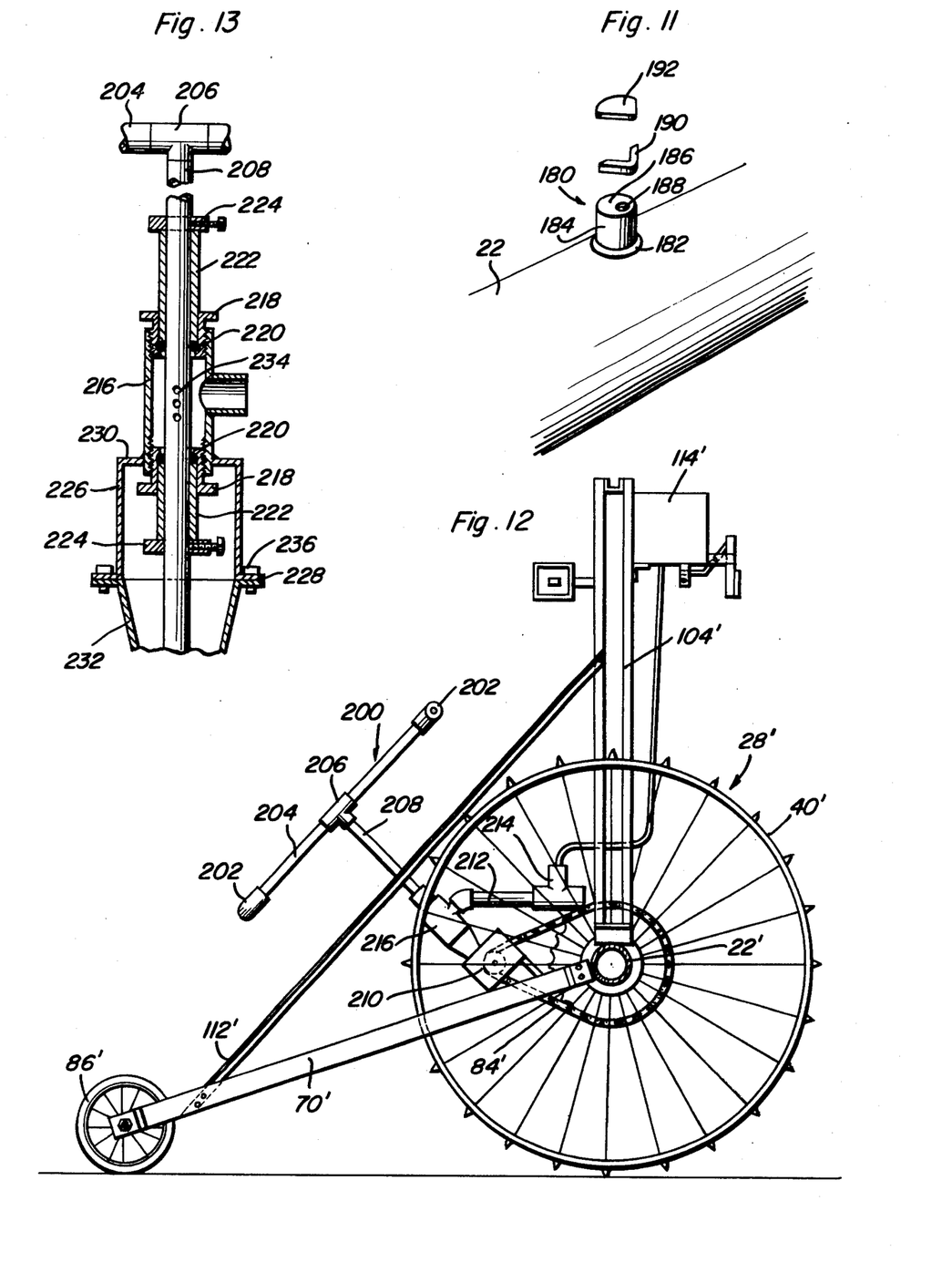
FIG. 11 is an exploded group perspective view of a rearwardly discharging nozzle assembly associated with the irrigation pipe.
FIG. 12 is a side elevational view similar to FIG. 6 but illustrating a water reaction nozzle drive assembly.
FIG. 13 is an exploded side elevational view of the structure which supports the nozzle drive assembly.

FIG. 11 illustrates a sprinkler or a nozzle generally designated by 180 which is employed in lieu of the sprinklers 24 in FIGS. 1–10 and which are oriented in spaced relation along the irrigation pipe 22' and produces a flat, fan pattern spray with a slight upward lift to the rear of the machine thus leaving the wheel traction area dry and reducing the spray drift due to wind to a minimum. The structure involves a threaded nipple rigid with the pipe and communicating therewith in a well known manner and a cylindrical end cap 184 threaded thereon or otherwise secured thereto such as by soldering or the like. The end cap 184 includes an outer end wall 186 having an eccentrically arranged opening 188 therein. A V-shaped spacer 190 is mounted on the outer surface of the end wall 186 of the cap 184 with the included angle of the V-shaped spacer in oriented alignment with the opening 188. Overlying the V-shaped spacer 190 and secured thereto is a cover plate or top plate 192 having a V-shaped edge 194 generally conforming with the V-shape of the spacer 190 and having an arcuate edge 196 spaced from the circular edge of the end cap 184 in remote relation to the opening 188. Thus, water passing upwardly through the opening 188 will be confined by the V-shaped spacer 190 and by the cover plate 192 so that all of the water will be discharged rearwardly in a fan-shaped configuration or pattern with the fan-shaped pattern being generally horizontal although the pattern may extend upwardly a small angle such as 5 degrees from horizontal. The fan-pattern overlaps in a manner to provide equal distribution of water to the surface area traversed, and since the fan pattern is substantially horizontal, there will be very minimal wind drift. Also rearward direction of the spray pattern will keep the traction area engaged by the drive wheels in substantially dry condition, thereby enhancing the traction capacities of the drive wheel.

FIGS. 12 and 13 illustrates another embodiment of the drive arrangement for the towers in which a reaction nozzle drive assembly generally designated by 200 is employed to drive the towers 28' in which the structure remains the same as that illustrated in FIGS. 1–10 except that the electric motor drive is removed and the reaction nozzle drive 200 is used in lieu thereof. In this arrangement, a pair of oppositely facing reaction nozzles 202 are mounted at the remote ends of a torque arm 204 which has a T coupling 206 at the center thereof and a hollow drive shaft 208 connected thereto which also supplies water to the nozzle 202. The hollow drive shaft 208 extends into a gear box 210 and drives the drive chain 84' in the same manner as in the arrangement in FIG. 1–10 for propelling the irrigation pipe in a circular path. Water under pessure is supplied from the irrigation pipe 22' to the hollow drive shaft or pipe 208 through a branch pipe 212 provided with a solenoid valve 214 to control the discharge of water from the nozzle 202 from a control box 114' so that the water being discharged from the nozzles 202 may be controlled by control of the solenoid valve 214 thus controlling the speed at which the wheel 40' is driven.

As illustrated, the hollow torque arm 204 is disposed in a plane which inclines downwardly and rearwardly and is disposed rearwardly of the traction wheel thus maintaining the traction area relatively dry and discharg-the water in overlapping inclined planes with the rotational torque developed by the nozzles 202 being varied by the pressure-volume characteristics of the water discharged therefrom.

The branch pipe 212 is connected to a T coupling 216 having a bushing 218 threaded into each end thereof which is provided with a seal 220. Extending into each of the bushings 218 is a smaller pipe nipple or bushing 222 provided with a thrust collar 224 at the outer end thereof. A section of large pipe 226 having an external flange 228 welded to the lower end and an internal flange 230 welded to the upper end supports the T coupling 216 and thus, the hollow drive shaft 208 from a flange adapter 232 which is connected to the flange 228 and rigidly affixed to the gear box 210. The lower end of the hollow drive shaft 208 is closed and provided with a flexible connection to a drive gear forming the input into the gear box 210 and a portion of the hollow drive shaft 208 in the interior of T coupling 216 is provided with a plurality of holes 234 which enables the water to flow into interior of the hollow shaft 208 and then upwardly into the T coupling 206. The thrust collars 224 are rigidly affixed to hollow shaft 208 by a set screw or the like and bushings 222, 218 and the seals 220 seal the hollow shaft in relation to the T coupling 216 with the bushings 222 having lubrication fittings thereon for maintaining the rotatable shaft 208 properly lubricated during rotation. The T coupling 216 and the pipe section 226 are rigidly affixed together by welding the flange 230 to the T coupling 216 and the flange 228 is welded to the lower end of the pipe section 226 and detachably secured to the flanged adapter 232 on the gear box 210 by suitable bolts 234. The bushing 218 are threaded into the T coupling 216 and the interior surface is machined from a shoulder for receiving the internal seal 220 with the pipe nipple or bushing 222 then being screw threaded into the bushing 218 until the inner end thereof contacts the seal 220. Thus, the rotatable mounting of the hollow drive shaft 208 is obtained with the two end thrust collars 224 preventing longitudinal movement of the drive shaft 208 and the seal 220 sealing the T coupling 216 to the drive shaft 208 on each side of the holes 234.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be restored to, falling within the scope of the invention.

What is claimed as new is as follows:

1. A pivot sprinkler comprising an elongate irrigation pipe having sprinkler means thereon at spaced intervals, wheeled tower units supporting the pipe at spaced intervals and a standpipe at one end of the irrigation pipe for supplying water under pressure to the irrigation pipe and defining a generally vertical axis about which the irrigation pipe rotates in a circular path for discharging water onto a predetermined land area, each of said wheeled tower units comprising an enlarged wheel having a central hub, said irrigation pipe extending through the central hub with the hub and wheel being journaled on the irrigation pipe, said standpipe including a vertically disposed supply pipe, said irrigation pipe having an elbow at the end thereof and a depending pipe rigid therewith, a short pipe section sealingly and flexibly connected to the supply pipe and the depending pipe, a sleeve journaling the depending pipe, supporting legs connected to the sleeve for supporting the sleeve rotatably thereby supporting the elbow and irrigation pipe for rotational movement.

2. The structure as defined in claim 1 wherein said sprinkler means includes a plurality of longitudinally spaced sprinkler nozzles on the irrigation pipe, each sprinkler nozzle including a plate having an aperture therein with the aperture facing upwardly, a spacer having a rearwardly opening V-shaped recess in alignment with the opening with the apex of the recess being forwardly of the opening, and an overlying cover plate spaced from the apertured plate and sealed with respect to the spacer for forming a rearwardly opening discharge plate for water.

3. A pivot sprinkler comprising an elongate irrigation pipe having sprinkler means thereon at spaced intervals, wheeled tower units supporting the pipe at spaced intervals and a standpipe at one end of the irrigation pipe for supplying water under pressure to the irrigation pipe and defining a generally vertical axis about which the irrigation pipe rotates in a circular path for discharging water onto a predetermined land area, each of said wheeled tower units comprising an enlarged wheel having a central hub, said irrigation pipe extending through the central hub with the hub and wheel being journaled on the irrigation pipe, and each wheeled tower unit including upwardly extending frame members, an upwardly facing convexly curved cable guide interconnecting the upper ends of the upwardly extending members, and cables extending over the cable guide and attached to the irrigation pipe at longitudinally spaced points thereby providing a cable truss support for the irrigation pipe between the wheeled tower units.

4. The structure as defined in claim 3 wherein said sprinkler means includes a plurality of longitudinally spaced sprinkler nozzles on the irrigation pipe, each sprinkler nozzle including a plate having an aperture therein with the aperture facing upwardly, a spacer having a rearwardly opening V-shaped recess in alignment with the opening and with the apex of the recess being forwardly of the opening, and an overlying cover plate spaced from the apertured plate and sealed with respect to the spacer for forming a rearwardly opening discharge plate for water.

5. A pivot sprinkler comprising an elongate irrigation pipe having sprinkler means thereon at spaced intervals, wheeled tower units supporting the pipe at spaced intervals and a standpipe at one end of the irrigation pipe for supplying water under pressure to the irrigation pipe and defining a generally vertical axis about which the irrigation pipe rotates in a circular path for discharging water onto a predetermined land area, each of said wheeled tower units comprising an enlarged wheel having a central hub, said irrigation pipe extending through the central hub with the hub and wheel being journaled on the irrigation pipe, and the wheeled tower unit remote from the standpipe including anchor means for a pair of alignment wires disposed parallel to the irrigation pipe and adapted to be associated with alignment control mechanism for maintaining the wheeled tower units in substantial radial alignment about the vertical axis of rotation of the standpipe.

6. The structure as defined in claim 5 wherein said sprinkler means includes a plurality of longitudinally spaced sprinkler nozzles on the irrigation pipe, each sprinkler nozzle including a plate having an aperture therein with the aperture facing upwardly, a spacer having a rearwardly opening V-shaped recess in alignment with the opening and with the apex of the recess being forwardly of the opening, and an overlying cover plate spaced from the apertured plate and sealed with respect to the spacer for forming a rearwardly opening discharge plate for water.

7. A pivot sprinkler comprising an elongate irrigation pipe having sprinkler means thereon at spaced intervals, wheeled tower units supporting the pipe at spaced intervals and a standpipe at one end of the irrigation pipe for supplying water under pressure to the irrigation pipe and defining a generally vertical axis about which the irrigation pipe rotates in a circular path for discharging water onto a predetermined land area, each of said wheeled tower units comprising an enlarged wheel having a central hub, said irrigation pipe extending through the central hub with the hub and wheel being journaled on the irrigation pipe, each of said wheeled tower units also includes a laterally extending frame connected with the irrigation pipe and extending in trailing relation to the irrigation pipe, and a trailing wheel rotatably mounted on the frame for engagement with the ground surface in spaced relation to the wheel journaled on the irrigation pipe for stabilizing each wheeled tower unit, together with drive means mounted on said frame and drivingly engaged with the wheel journaled on the irrigation pipe for moving the irrigation pipe in a circular path, said trailing wheel also transmitting drive torque exerted on the frame by the drive wheel journaled on the irrigation pipe, said wheel journaled on the irrigation pipe being substantially larger in diameter than the trailing wheel and provided with traction cleats on the external periphery, said central hub including a cylindrical axle member fixedly secured to the exterior of the irrigation pipe, and a cylindrical external hub journaled on the axle for relative rotation, means preventing axial movement of the external hub on the axle, said external hub including a sprocket gear fixedly attached thereto to enable driving rotation of the large drive wheel, said frame includes a pair of spaced frame members receiving the trailing wheel therebetween, a cylindrical axle member extending between the frame members and engaging the opposed facing surfaces thereof, an external hub of cylindrical construction rigid with the trailing wheel and journaled on the axle with the ends of the external hub being disposed slightly inwardly of the ends of the axle, and a through-bolt extending through the cylindrical axle and the frame members for moving the frame members toward each other thereby fixedly securing the cylindrical axle to the frame members, and said standpipe including a vertically disposed supply pipe, said irrigation pipe having an elbow at the end thereof and a depending pipe rigid therewith, a short pipe section sealingly and flexibly connected to the supply pipe and the depending pipe, a sleeve journaling the depending pipe, supporting legs connected to the sleeve for supporting the sleeve rotatably thereby supporting the elbow and irrigation pipe for rotational movement.

8. The structure as defined in claim 7 wherein said sprinkler means includes a plurality of longitudinally spaced sprinkler nozzles on the irrigation pipe, each sprinkler nozzle including a plate having an aperture therein with the aperture facing upwardly, a spacer having a rearwardly opening V-shaped recess in alignment with the opening and with the apex of the recess being forwardly of the opening, and an overlying cover plate spaced from the apertured plate and sealed with respect to the spacer for forming a rearwardly opening discharge plate for water.

9. The structure as defined in claim 7 wherein each wheeled tower unit includes upwardly extending frame members, an upwardly facing convexly curved cable guide interconnecting the upper ends of the upwardly extending members, and cables extending over the cable guide and attached to the irrigation pipe at longitudinally spaced points thereby providing a cable truss support for the irrigation pipe between the wheeled tower units, the wheeled tower unit remote from the standpipe including anchor means for a pair of alignment wires disposed parallel to the irrigation pipe and adapted to be associated with alignment control mechanism for maintaining the wheeled tower units in substantial radial alignment about the vertical axis of rotation of the standpipe.

10. A pivot sprinkler comprising an elongated irrigation pipe having sprinkler means thereon at spaced intervals, wheeled tower units supporting the pipe at spaced intervals and a standpipe at one end of the irrigation pipe for supply water under pressure to the irrigation pipe and defining a generally vertical axis about which the irrigation pipe rotates in a circular path for discharging water onto a predetermined land area, each of said wheeled tower units comprising an enlarged wheel having a central hub, said irrigation pipe extending through the central hub with the hub and wheel being journaled on the irrigation pipe, each of said wheeled tower units also includes a laterally extending frame connected with the irrigation pipe and extending in trailing relation to the irrigation pipe, and a trailing wheel rotatably mounted on the frame for engagement with the ground surface in spaced relation to the wheel journalled on the irrigation pipe for stabilizing each wheeled tower unit, together with drive means mounted on said frame and drivingly engaged with the wheel journalled on the irrigation pipe for moving the irrigation pipe in a circular path, said trailing wheel also transmitting drive torque exerted on the frame by the drive wheel journaled on the irrigation pipe, said wheel journaled on the irrigation pipe being substantially larger in diameter than the trailing wheel and provided with traction cleats on the external periphery, said central hub including a cylindrical axle member fixedly secured to the exterior of the irrigation pipe, and a cylindrical external hub journaled on the axle for relative rotation, means preventing axial movement of the external hub on the axle, said external hub including a sprocket gear fixedly attached thereto to enable driving rotation of the large drive wheel, said frame includes a pair of spaced frame members receiving the trailing wheel therebetween, a cylindrical axle member extending between the frame members and engaging the opposed facing surfaces thereof, an external hub of cylindrical construction rigid with the trailing wheel and journaled on the axle with the ends of the external hub being disposed slightly inwardly of the ends of the axle, and a through-bolt extending through the cylindrical axle and the frame members for moving the frame members toward each other thereby fixedly securing the cylindrical axle to the frame members, and each wheeled tower unit including upwardly extending frame members, an upwardly facing convexly curved cable guide interconnecting the upper end of the upwardly extending members, and cables extending over the cable guide and attached to the irrigation pipe at longitudinally spaced points thereby providing a cable truss support for the irrigation pipe between the wheeled power units.

11. The structure as defined in claim 10 wherein said sprinkler means includes a plurality of longitudinally spaced sprinkler nozzles on the irrigation pipe, each sprinkler nozzle including a plate having an aperture therein with the aperture facing upwardly, a spacer having a rearwardly opening V-shaped recess in alignment with the opening and with the apex of the recess being forwardly of the opening, and an overlying cover plate spaced from the apertured plate and sealed with respect to the spacer for forming a rearwardly opening discharge plate for water.

12. A pivot sprinkler comprising an elongate irrigation pipe having sprinkler means thereon at spaced intervals, wheeled toward units supporting the pipe at spaced intervals and a standpipe at one end of the irrigation pipe for supplying water under pressure to the irrigation pipe and defining a generally vertical axis about which the irrigation pipe rotates in a circular path for discharging water onto a predetermined land area, each of said wheeled tower units comprising an enlarged wheel having a central hub, said irrigation pipe extending through the central hub with the hub and wheel being being journaled on the irrigation pipe, each of said wheeled tower units also includes a laterally extending frame connected with the irrigation pipe and extending in trailing relation to the irrigation pipe, and a trailing wheel rotatably mounted on the frame for engagement with the ground surface in spaced relation to the wheel journaled on the irrigation pipe for stabilizing each wheeled tower unit, together with drive means mounted on said frame and drivingly engaged with the wheel journaled on the irrigation pipe for moving the irrigation pipe in a circular path, said trailing wheel also transmitting drive torque exerted on the frame by the drive wheel journaled on the irrigation pipe, said wheel journaled on the irrigation pipe being substantially larger in diameter than the trailing wheel and provided with traction cleats on the external periphery, said central hub including a cylindrical axle member fixedly secured to the exterior of the irrigation pipe, and a cylindrical external hub journaled on the axle for relative rotation, means preventing axial movement of the external hub on the axle, said external hub including a sprocket gear fixedly attached thereto to enable driving rotation of the large drive wheel, said frame includes a pair of spaced frame members receiving the trailing wheel therebetween, a cylindrical axle member extending between the frame members and engaging the opposed facing surfaces thereof, an external hub of cylindrical construction rigid with the trailing wheel and journaled on the axle with the ends of the external hub being disposed slightly inwardly of the ends of the axle, and a through-bolt extending through the cylindrical axle and the frame members for moving the frame members toward each other thereby fixedly securing the cylindrical axle to the frame members, and the wheeled tower unit remote from the standpipe i including anchor means for a pair of alignment wires disposed parallel to the irrigation pipe and adapted to be associated with alignment control mechanism for maintaining the wheeled tower units in substantial radial alignment about the vertical axis of rotation of the standpipe.

13. The structure as defined in claim 12 wherein said sprinkler means includes a plurality of longitudinally spaced sprinkler nozzles on the irrigation pipe, each sprinkler nozzle including a plate having an aperture therein with the aperture facing upwardly, a spacer having a rearwardly opening V-shaped recess in alignment with the opening and with the apex of the recess being forwardly of the opening, and an overlying cover plate spaced from the apertured plate and sealed with respect to the spacer for forming a rearwardly opening discharge plate for water.

14. In an irrigation system of the type including a pipe movable in a circular path, a standpipe communicated with and supporting one end of the pipe, said standpipe including a rigid generally vertically disposed supply pipe, a short section of pipe telescopically associated with the supply pipe and sealed thereto by an O-ring seal, a vertically disposed pipe rigid with the irrigation pipe telescoped with respect to the short section of pipe and sealed thereto by an O-ring seal, sleeve means rigidly supported and disposed in encircling relation to the vertical pipe rigid with the irrigation pipe for journaling the vertical pipe with the O-ring seals enabling some degree of flexibility between the vertical pipe rigid with the irrigation pipe and the supply pipe.

15. The combination of an irrigation pipe and a supporting structure therefor, said irrigation pipe being generally rigid and non-rotatable and adapted to be provided with liquid discharge means thereon, said supporting structure including an enlarged wheel having a central hub, said irrigation pipe extending through the central hub and journaling the enlarged wheel thereon whereby the irrigation pipe has a centerline substantially coincidental with the rotational axis of the wheel, together with frame means extending from the irrigation pipe and journaling a smaller trailing wheel thereon in engagement with the ground surface, drive means on the frame for driving engagement with the wheel whereby the trailing wheel stabilizes the driving wheel and transmits driving torque exerted on the frame by the driving wheel to the ground surface, and said drive means being in the form of a pair of reaction nozzles communicated with the irrigation pipe and in driving engagement with the drive wheel, a solenoid valve controlling flow of water to the reaction nozzles, and means sealingly supporting and rotatably supporting the reaction nozzles from the frame.

16. The structure as defined in claim 15 wherein said sprinkler means includes a plurality of longitudinally spaced sprinkler nozzles on the irrigation pipe, each sprinkler nozzle including a plate having an aperture therein with the aperture facing upwardly, a spacer having a rearwardly opening V-shaped recess in alignment with the opening and with the apex of the recess being forwardly of the opening, and an overlying cover plate spaced from the apertured plate and sealed with respect to the spacer for forming a rearwardly opening discharge plate for water.

* * * * *

UNITED STATES PATENT AND TRADEMARK OFFICE
Certificate
Patent No. 3,957,204      Patented May 18, 1976

Howard R. Farris and Calmer J. Johnson

Application having been made by Howard R. Farris and Calmer J. Johnson, the inventors named in the patent above identified, for the issuance of a certificate under the provisions of Title 35, Section 256, of the United States Code, deleting the name of Howard R. Farris as a joint inventor, and a showing and proof of facts satisfying the requirements of the said section having been submitted, it is this 18th day of October 1977, certified that the name of the said Howard R. Farris is hereby deleted from the said patent as a joint inventor with the said Calmer J. Johnson.

FRED W. SHERLING,
*Associate Solicitor.*